(12) United States Patent
Svinth

(10) Patent No.: US 11,454,217 B2
(45) Date of Patent: Sep. 27, 2022

(54) SYSTEM FOR CRANELESS BLADE MOUNTING AND DISMOUNTING AT WIND TURBINES

(71) Applicant: ENABL A/S, Hedensted (DK)

(72) Inventor: Kenneth Helligsø Svinth, Galten (DK)

(73) Assignee: ENABL A/S, Hedensted (DK)

(*) Notice: Subject to any disclaimer, the term of this patent is extended or adjusted under 35 U.S.C. 154(b) by 0 days.

(21) Appl. No.: 16/757,814

(22) PCT Filed: Oct. 23, 2018

(86) PCT No.: PCT/DK2018/050267
§ 371 (c)(1),
(2) Date: Apr. 21, 2020

(87) PCT Pub. No.: WO2019/080980
PCT Pub. Date: May 2, 2019

(65) Prior Publication Data
US 2021/0270241 A1   Sep. 2, 2021

(30) Foreign Application Priority Data
Oct. 23, 2017 (DK) .......................... PA 2017 70800

(51) Int. Cl.
*F03D 13/10* (2016.01)
(52) U.S. Cl.
CPC ........ *F03D 13/10* (2016.05); *F05B 2240/912* (2013.01); *F05B 2240/916* (2013.01)

(58) Field of Classification Search
CPC . F03D 13/00; F03D 1/06; F03D 80/50; F05B 2240/912; F05B 2240/916; F05B 2230/61; B66C 1/10
See application file for complete search history.

(56) References Cited

U.S. PATENT DOCUMENTS

| | | |
|---|---|---|
| 2006/0228220 A1 | 10/2006 | Wobben |
| 2007/0290426 A1 | 12/2007 | Trade |
| 2012/0137483 A1 | 6/2012 | Lindberg |
| 2014/0360015 A1 | 12/2014 | Lohan |
| 2015/0232307 A1 | 8/2015 | Holloway |
| 2015/0233341 A1 | 8/2015 | Neumann |
| 2018/0362306 A1* | 12/2018 | Lopez-Benedito ... F03D 1/0658 |

FOREIGN PATENT DOCUMENTS

| | | |
|---|---|---|
| EP | 2224126 A2 | 9/2010 |
| EP | 2886503 A1 | 6/2015 |
| EP | 2908000 20 | 8/2015 |
| WO | 2017041090 A1 | 3/2017 |

* cited by examiner

*Primary Examiner* — Moshe Wilensky
(74) *Attorney, Agent, or Firm* — Cermak Nakajima & McGowan LLP; James Creighton Wray

(57) ABSTRACT

System (1) for craneless blade (6) mounting and dismounting at wind turbines (2), wherein the system (1) at least comprises a blade tip beam (9) to be fixed at the blade (6) and a blade supporting structure (15) to be connected with and to guide and secure the blade tip beam (9) while the supporting structure (15) is displaced in a substantially horizontal direction, whereby total control of the blade (6) when moved from vertical position towards horizontal position and until the blade (6) is safe on a cradle or support (15) or opposite during mounting is achieved.

10 Claims, 14 Drawing Sheets

SYSTEM FOR CRANELESS BLADE MOUNTING AND DISMOUNTING AT WIND TURBINES

This application claims the benefit of Danish Application No. PA 2017 70800 filed Oct. 23, 2017 and PCT/DK2018/050267 filed Oct. 23, 2018, International Publication No. WO 2019/080980 A1, and the amended sheets from the IPRP, which are hereby incorporated by reference in their entirety as if fully set forth herein.

The present invention relates to a system for craneless blade mounting and dismounting at wind turbines, wherein the system at least comprises a blade tip beam to be fixed at the blade and a blade supporting structure to be connected with and to guide and secure the blade tip beam while the supporting structure is displaced in a substantially horizontal direction.

The present invention also relates to a blade tip beam for a system for craneless blade mounting and dismounting at wind turbines, the use of a blade tip beam for controlling the movement of the tip end of a wind turbine blade during mounting of the blade to or dismounting of the blade from a hub of a wind turbine, a method for craneless blade mounting at wind turbines as well as a method for craneless blade dismounting at wind turbines.

PRIOR ART

Before the development of the present invention, it was known from US 2014360015 A1 to have a method of lowering a wind turbine blade after removal from a wind turbine tower with a solution comprising a tip sock located around the blade tip, upper tag lines for controlling the root of the wing and lower tag lines for controlling the tip of the wing, where a pick crane with wheels, is able to pull the blade tip free from the wind turbine tower and where the blade can be placed in a flatbed cradle, where the cradle also is with wheels subsequently can be driven away from wind turbine after dismounting, or in reverse order, during mounting.

From US 2015232307 A1 is it also known to have a method for removing a rotor blade from a wind turbine with a solution comprising a blade sock located closer to the tip of the blade than the root, cables for controlling the root of the blade, where a crane with wheels via the cables connected to the blade sock is able to pull the blade tip free from the tower and where the blade can be placed in a horizontal position after dismounting, or in reverse order, during mounting.

From EP 2224126 A2 is it further known to have an arrangement and method for lowering and raising a single rotor blade of a wind turbine from a six-o'clock position, with a solution comprising a blade protector, lifting lines for controlling the root of the blade, in which a tail pick crane with wheels via the support line is connected to the blade tip to pull the blade tip free from the wind turbine tower and where the blade can be placed in a horizontal position after dismounting, or in reverse order, during mounting.

One of the disadvantages of these known arrangements is the use of a crane, which is expensive and heavy equipment that normally has to be rented.

Another disadvantage of the known arrangements is the lack of total control over the blade in the crucial phase, where the blade is moved from vertical position towards horizontal position and until the blade is safe on a cradle or support or opposite from a cradle or support during mounting.

OBJECT OF THE INVENTION

The object of this invention is therefore to provide a system for craneless blade mounting and dismounting at wind turbines of the type mentioned in the introduction with a solution comprising a blade tip beam which is to be clamped at or around the blade and which is to be controlled and lead down into contact with a blade supporting structure whereto the blade tip beam is fixed and which ensures total control of the blade when moved from vertical position towards horizontal position and until the blade is safe on a cradle or support or the opposite during mounting.

It is a further object of the invention to make a system for blade mounting and dismounting at wind turbines, where the system is craneless, lighter and more flexible than the known prior-art technology.

DESCRIPTION OF THE INVENTION

According to an aspect of the invention, the above object is achieved with a system for craneless blade mounting and dismounting at wind turbines, wherein the system at least comprises a blade tip beam to be fixed at the blade and a blade supporting structure to be connected with and to guide and secure the blade tip beam while the supporting structure is displaced in a substantially horizontal direction;

where the blade tip beam at least comprises a longitudinal beam with a first end and a second end and where the blade tip beam further at least comprises a first clamping device, where the beam is adapted to be arranged substantially parallel to the lengthwise direction of a blade with the first end of the blade tip beam extending in the same direction as the tip end of the blade and where the at least one clamping device is adapted to be clamped at least partially around the blade in the crosswise direction of the blade and;

wherein the blade supporting structure being adapted to receive and support said first end of the blade tip beam with a variable angle of the blade tip beam during displacement of the blade supporting structure;

wherein the system further comprises equipment for hoisting and/or lowering the blade by means of at least a first winch and at least a first wire for connection between the first winch and the blade;

wherein the first wire is connected with the blade at a root end of the blade or in a position between the root end and the centre of gravity of the blade for the blade to hang substantially vertical; and wherein the connection between the first winch and the blade is effected via a hub of the wind turbine or via a crane arranged at a nacelle of the wind turbine.

The system according to the present invention is denoted as a system for craneless blade mounting and dismounting at wind turbines, which is a term used by skilled persons. Hereby is meant that there is no need for a crane having the size used for a standard assembly procedure. A self-hoisting crane or a stationary service crane arranged at the nacelle may however be used in a system which by skilled persons may called a system for craneless blade mounting and dismounting at wind turbines.

This makes it possible to provide a system for craneless blade mounting and dismounting at wind turbines, where a blade tip beam clamped at and/or around a blade and controlled and fixed to a blade supporting structure is under total control when a blade is moved from vertical position towards horizontal position and until the blade is safe and secure on a cradle or support or the opposite way during mounting.

This makes it possible to either have the clamping device to be clamped partially around the blade or to have the clamping device to be clamped all the way around the blade in the crosswise direction of the blade.

This is possible without the use of a crane being part of the system for hoisting/lowering the blade, by means of wires/ropes/slings etc.

The blade tip beam can be considered a yoke.

The first end of the blade tip beam is the end closest to the tip of the blade. The first end of the blade tip beam is the end closest to the support structure.

The blade tip beam and the blade supporting structure increase the control over the blade during mounting and dismounting, especially in the crucial phase where the blade is rotated to a more horizontal position from a more vertical position or from a more vertical position to a more horizontal position.

The support structure makes sure that the blade cannot rotate around the first wire and hit the tower of the wind turbine.

Additionally, the blade tip beam and supporting structure can protect the blade tip from pressure which may risk damaging the blade. This is possible as the blade tip beam distributes pressure away from the tip to an area of the blade which is sturdier than the blade tip.

The first wire can alternatively establish a connection between the first winch and the blade. This may be effected at the root end or the blade tip beam via a self-hoisting crane or a stationary service crane.

With respect to the connection of the first wire to the blade, "the root end of the blade" can be any point between the actual root end of the blade and the centre of gravity of the blade. Such that, when hoisted from this point, the blade will be oriented with the root end higher than the blade tip or the root end level with the blade tip, preferably with a substantially vertical orientation.

It is more advantageous to connect the first wire to the blade in a position not directly at the root end but instead located at least a distance away from the root end.

The advantage of connecting not directly to the root end of the blade, but between root end and centre of gravity is that the first wire does not need a support or mounting inside of the hub. Thus, the mounting or support for the first wire can be located at other places of the wind turbine. Without limiting to this list, examples are a crossbar extending out of the hub, on top of the nacelle or on a side of the nacelle. For example a self-hoisting crane or a stationary crane on the nacelle can be used. The first wire may be connected to the blade through suitable clamping means ensuring a secure grip between the blade and the first wire.

In a further aspect, the present invention also relates to a system, wherein the system further comprises at least a first tag wire.

This allows for better control of the wing during mounting and demounting. This is especially advantageous, when the first wire is attached near the centre of gravity of the blade. In this case the first tag wire prevents the blade from hitting the tower. It can be held manually or it can be operated by a winch.

In a further aspect, the present invention also relates to a system, wherein the system further comprises at least a first tag wire winch and a first tag wire for connection between the blade and the first tag wire winch.

In a further aspect, the present invention also relates to a system, wherein the system further comprises equipment for hoisting and/or lowering the blade by means of at least a first winch and at least a first wire for connection between the first winch and a root end of the blade via a hub of a wind turbine and at least a first tag wire winch and a first tag wire for connection between the blade and the first tag wire winch.

This makes it possible to hoist and/or lower the blade, while at the same time being able to control the sideways movement of the blade due to the tag wire connection to the blade. The tag wire is necessary to keep control of the blade at all times, due to the fact that a blade having a substantial surface, size and weight easily could get into movement by the wind.

By the first tag wire to be connected between the blade and the first tag wire winch, it is meant that the connection could be either direct between the blade and the first tag wire or it could be indirect via the blade tip team (as shown at the figures) and the first tag wire.

In a further aspect, the present invention also relates to a system, wherein the system further comprises a root wire for connection between the blade tip beam and the root end of the blade.

This makes it possible to ensure that the blade tip beam at all times remains in the desired position, so that it does not by accident slip off the blade causing risk for the personnel or cause material damage on the blade etc.

In a further aspect, the present invention also relates to a system, wherein the system further comprises at least a second tag wire winch and a second tag wire for connection between the blade and the second tag wire winch, wherein a V-formation of the tag wires being achievable.

This makes it possible to ensure a safer and more secure operation, where the blade will be more steadily controlled by use of two tag wires positioned, so that a V-formation is formed. With a V-formation a sideways swing of the blade is avoided, which would be more likely to happen when using only one tag wire.

As also mentioned regarding the first tag wire, the second tag wire to be connected between the blade and the second tag wire winch, it is meant that the connection could be either direct between the blade and the second tag wire or it could be indirect via the blade tip beam (as shown at the figures) and the second tag wire.

In a further aspect, the present invention also relates to a system, wherein the system further comprises a system capable of automatically control and regulation of the first winch and in a an even further aspect, the present invention also relates to a system, wherein the system for automatically control and regulation of the first winch is adapted to ensure that at least 60%, such as in the range of 60-90%, e.g. in the range of 70-80%, of the weight of the blade, is placed on the first winch, when the blade is supported by the blade supporting structure during lowering and/or hoisting the blade.

This makes it possible to ensure that the system works as intended, that is mounting and dismounting blades at wind turbines in a safe and secure matter, where no equipment is damaged and no personnel is at any safety risk. Further it ensures that no human error causes unintentional impact on the blade or ancillary equipment. It thus makes it possible to ensure that the tip of the blade and hence the blade as a whole do not get damaged while putting too much weight on the tip.

In a further aspect, the present invention also relates to a system, wherein the blade tip beam further comprises a second clamping device placed substantially perpendicular to the longitudinal beam and substantially parallel with and in the same direction as the first clamping device.

This makes it possible to get a better grip and hold of the blade, thus making the blade tip beam more stable and thereby making the system as a whole more stable.

This makes it further possible to either have the clamping devices to be clamped partially around the blade or to have the clamping devices to be clamped all the way around the blade in the crosswise direction of the blade or a combination of both.

In a further aspect, the present invention also relates to a system, wherein the blade supporting structure comprises a tiltable hopper device adapted to receive and support said first end of the blade tip beam with a variable angle of the blade tip beam during displacement of the blade supporting structure.

This makes it possible to control the movement of the blade tip beam to and from horizontal position and thereby ensure that the blade remains in the position as desired and that the blade does not by accident e.g. hit the ground etc.

In a further aspect, the present invention also relates to a system, wherein the blade tip beam and the blade supporting structure is arranged to be fixed together by locking means and in an even further aspect, the present invention also relates to a system, wherein the blade supporting structure further comprises locking means adapted to fixating the tiltable hopper device of the blade supporting structure to the blade tip beam.

This makes it possible to further control the movement of the blade tip beam to and from horizontal position by fixation and locking the blade tip beam and the blade supporting structure together.

The locking means could be any kind of mechanical lock, magnetical lock, electrical lock or a combination of several locks.

In a further aspect, the present invention also relates to a system, wherein the blade supporting structure further comprises wheels.

This makes it possible to move the blade supporting structure in an easier way, when moving the blade supporting structure away from the wind turbine while lowering the blade or when moving the blade supporting structure towards the wind turbine while hoisting the blade.

In a further aspect, the present invention also relates to a system, wherein the system further comprises at least a root support for supporting the root end of the blade and in an even further aspect, the present invention also relates to a system, wherein the root support at least comprises a part complementary with part of the cross sectional area of the blade.

This makes it possible to lay down the root end of the blade on a predetermined structure, and even on a predetermined structure which is complementary with certain parts of the blade, that means that the root support is customised or tailor-made for the particular blade.

In a further aspect, the present invention also relates to a system, wherein the root support further comprises wheels.

This makes it possible to move the root support in an easier way, when moving the blade supported by the blade supporting structure and the root support away from or towards the wind turbine. When the equipment—blade supporting structure and root support—is no longer needed and has to be removed the wheeling parts are easier to handle and could all be towed away by a vehicle.

This makes it further possible to transport the blade to and from the site at the wind turbine, from where the blade is to be mounted and dismounted.

In a further aspect, the present invention also relates to a blade tip beam for a system for craneless blade mounting and dismounting at wind turbines, wherein the blade tip beam comprises a longitudinal beam with a first end and a second end and where the blade tip beam further comprises a first clamping device placed substantially perpendicular to the longitudinal beam and closer to the second end than to the first end, where the beam is adapted to be arranged substantially parallel to the lengthwise direction of a blade and where the at least one clamping device is adapted to be clamped at least partially around the blade in the crosswise direction of the blade.

This makes it possible to either have the clamping devices to be clamped partially around the blade or to have the clamping devices to be clamped all the way around the blade in the crosswise direction of the blade. It is also possible to fixate the beam to the blade, where the beam is to be used in connection with the blade supporting structure.

In a further aspect, the present invention also relates to a blade tip beam, wherein the blade tip beam further comprises a second clamping device placed substantially perpendicular to the longitudinal beam and substantially parallel with and in the same direction as the first clamping device and in an even further aspect, the present invention also relates to a blade tip beam, wherein the distance between the first clamping device and the second clamping device of the blade tip beam is maximum 4 meter, such as in the range of 1-3 meter, e.g. in the range of 1.5-2.5 meter.

This makes it possible to further secure the grip at the blade, so that there are two clamping devices each clamping at a different place at the blade and hence ensuring that the blade tip beam is more stable fastened to the blade. Meanwhile, it is not so important where the clamps are positioned at the blade, in theory it could be placed anywhere the blade manufacturer accepts. What is necessary to get the best result, is to clamp at the places where the blade is strongest, which varies from blade to blade, dependent on the manufacture of the blade.

What is paramount though, is the fact that there is at least one clamp device with a beam, that is the blade tip beam, where the end of the blade tip beam is able to fit into and be connected, fixed etc. to the blade supporting structure and preferably controlled during the whole process by two tag wires at the ground or base.

In a further aspect, the present invention also relates to a blade tip beam, wherein the length of the first end of the blade tip beam is at least 0.5 meter, such as in the range of 0.5-3 meter, e.g. in the range of 1-2 meter.

This makes it possible to get the end of the blade tip beam to fit into contact with the blade supporting structure without the blade tip end getting in the way.

In a further aspect, the present invention also relates to a blade tip beam, wherein the blade tip beam is adapted to be mounted from the blade tip end of a blade, from which end the blade is smaller in circumference and blade thickness than the blade root end, and where at least the first clamping device and/or the second clamping device has a maximum span larger than the measures of the blade tip end but smaller than the measures of the blade root end.

This makes it possible to ensure that the blade tip beam is not getting fastened at the blade in a false manner, e.g. in a different direction or from a different side of the bladeprofile than it was intentionally planned.

In a further aspect, the present invention also relates to a blade tip beam, wherein the first end of the blade tip beam is adapted to extend beyond the blade tip.

This makes it possible to get the end of the blade tip beam to fit into contact with the blade supporting structure without the blade tip end getting in the way.

In a further aspect, the present invention also relates to a blade tip beam, wherein the blade tip beam further comprises locking means capable of securing the blade tip beam to a blade supporting structure being adapted to at least receive and support said first end of the blade tip beam with a variable angle of the blade tip beam during displacement of the blade supporting structure.

This makes it possible to control the movement of the blade tip beam to and from horizontal position by locking the blade tip beam and the blade supporting structure together.

In a further aspect, the present invention also relates to a use of a blade tip beam for controlling the movement of the tip end of a wind turbine blade during mounting of the blade to or dismounting of the blade from a hub of a wind turbine, wherein the blade tip beam is temporarily fastened to said blade, so that the blade tip beam extends substantially parallel to the longitudinal direction of said blade, where a first end of the blade tip beam extends in the same direction as the tip end of the blade and where the blade tip beam is adapted to be partial supported by a blade supporting structure which is displaceable arranged.

This makes it possible to use a blade tip beam to gain an optimal control of the movement of the blade during mounting of the blade to or dismounting of the blade from a hub of a wind turbine.

In a further aspect, the present invention also relates to a use of a blade tip beam for controlling the movement of the tip end of a wind turbine blade during dismounting of a blade from or mounting of a blade to a hub of a wind turbine, wherein a system for automatically control and regulation of the first winch ensure that at least 60%, such as in the range of 6090%, e.g. in the range of 70-80%, of the weight of the blade, is placed on a first winch, when the blade is supported by the blade supporting structure during lowering and/or hoisting the blade.

This makes it possible to ensure that the tip of the blade and the blade as a whole do not get damaged while putting too much weight on the tip of the blade. It is a risk which is easier to foresee regarding onshore installations, while it is yet more difficult to foresee movements regarding offshore installations. When installations offshore takes place, the blades are to be handled from the sea, and when not using expensive push up rigs, vessels are to be used. Where the vessel due to a Dynamic Positioning (DP) system is able to compensate for the current and waves in the horizontal position, DP is not able to make up for the waves in vertical position. So the automatically control and regulation is a precaution which is extremely important especially at offshore installations, like offshore wind farms.

In a further aspect, the present invention also relates to a use of a blade tip beam, where the first end of the blade tip beam extends beyond the tip end of the blade in the longitudinal direction of said blade.

This makes it possible to get the end of the blade tip beam to fit into contact with the blade supporting structure without the blade tip end getting in the way.

In a further aspect, the present invention also relates to a use of a blade tip beam, where the first end of the blade tip beam is able to cooperate with a receiving part at the blade supporting structure.

This makes it possible to use a blade tip beam, in cooperation with a blade supporting structure, to gain an optimal control of the movement of the blade during mounting of the blade to or dismounting of the blade from a hub of a wind turbine.

In a further aspect, the present invention also relates to a use of a blade tip beam, for a system to craneless blade dismounting and mounting at wind turbines.

This makes it possible to conduct mounting of the blade to or dismounting of the blade from a hub of a wind turbine easier, cheaper, with less expensive equipment and that without the use of a crane.

In a further aspect, the present invention also relates to a use of a blade tip beam, wherein the blade tip beam further comprises at least a second clamping device placed substantially perpendicular to the longitudinal beam and substantially parallel with and in the same direction as the first clamping device.

This makes it possible to further secure the grip at the blade, so that there are two clamping devices each clamping at a different place at the blade and hence ensuring that the blade tip beam are more stable fastened to the blade.

In a further aspect, the present invention also relates to a use of a blade tip beam and a blade supporting structure, wherein the distance between the first clamping device and the second clamping device of the blade tip beam is maximum 4 meter, such as in the range of 1-3 meter, e.g. in the range of 1.5-2.5 meter.

This makes it possible to position the blade tip beam at the blade, at the places where the blade is strongest, which may vary from blade to blade, dependent on the blade manufacturer.

In a further aspect, the present invention also relates to a use of a blade tip beam and a blade supporting structure, wherein the length of the first end of the blade tip beam is at least 0.5 meter, such as in the range of 0.5-3 meter, e.g. in the range of 1-2 meter.

This makes it possible to get the end of the blade tip beam to fit into contact with the blade supporting structure without the blade tip end getting in the way.

In a further aspect, the present invention also relates to a method for craneless blade mounting at wind turbines, wherein the method comprising the following steps:

a1) connecting a first wire between a hub of a wind turbine and a blade root of a blade, a2) securing a blade tip beam with a first end to the blade by clamping, a3) controlling and regulating the tension of the first wire, so that it supports at least 60%, such as in the range of 60-90%, e.g. in the range of 70-80%, of the weight of the blade, while the rest of the weight of the blade is supported by a blade supporting structure, a4) hoisting the blade root end by means of the first wire, a5) moving the blade supporting structure, which is supporting the blade, towards the wind turbine while hoisting the blade by the blade root end.

This makes it possible to accomplish a craneless blade mounting method at wind turbines, where a blade tip beam is clamped at or around a blade and controlled and fixed to a blade supporting structure at the beginning.

In a further aspect, the present invention also relates to a method, wherein the method at least comprises the following further step at least after step a2):

b1) fastening the blade tip beam to the blade root end by a root wire.

This makes it possible due to the root wire to ensure that the blade tip beam and hence the clamps do not lose their grip and slip off the blade.

In a further aspect, the present invention also relates to a method, wherein the method at least comprises the following further steps at least before step a3):

c1) hoisting auxiliary equipment to a nacelle of a wind turbine and installing the equipment, c2) hoisting blade hoist equipment to the hub using at least an auxiliary winch, c3) assembling the blade hoist equipment as needed, c4) attaching the first wire to the blade hoist and attaching the first wire to the blade root end.

This makes it possible both to get all the equipment transported to the right place of usage and to get the equipment assembled and attached.

Whether the auxiliary equipment and the blade hoist equipment is hoisted to a nacelle or to a hub is not itself important and it is therefore—in this case—meant that it could be either, depending on the specific wind turbine construction.

In a further aspect, the present invention also relates to a method, wherein the method at least comprises the following further steps at least before step a4):

d1) attaching at least a tag wire to the blade for controlling the blade movement, d2) adding lifting slings and/or additional wires to the blade root end for further supporting options of the blade.

This makes it possible to hoist the blade, after having attached the tag wire to the blade being able to control the sideways movement of the blade, as well as further enhancements are possible.

In a further aspect, the present invention also relates to a method, wherein the blade supporting structure being adapted to at least receive and support said first end of the blade tip beam with a variable angle of the blade tip beam during displacement of the blade supporting structure.

This makes it possible to control the movement of the blade tip beam due to the blade supporting structure and from horizontal position and to a certain angle from horizontal during mounting and thereby ensure that the blade remains in the position as desired and that the blade does not by accident e.g. hit the ground etc.

In a further aspect, the present invention also relates to a method, wherein the blade tip beam further comprises at least a second clamping device placed substantially perpendicular to the longitudinal beam and substantially parallel with and in the same direction as the first clamping device, and in an even further aspect, the present invention also relates to a method, wherein the distance between the first clamping device and the second clamping device of the blade tip beam is maximum 4 meter, such as in the range of 1-3 meter, e.g. in the range of 1.5-2.5 meter.

This makes it possible to further secure the grip at the blade, so that there are two clamping devices each clamping at a different place at the blade and hence ensuring that the blade tip beam are more stable fastened to the blade. This makes it further possible to position the blade tip beam at the blade, at the places where the blade is strongest, which may vary from blade to blade, dependent on the blade manufacturer.

In a further aspect, the present invention also relates to a method, wherein the length of the first end of the blade tip beam is at least 0.5 meter, such as in the range of 0.5-3 meter, e.g. in the range of 1-2 meter.

This makes it possible to get the end of the blade tip beam to fit into contact with the blade supporting structure without the blade tip end getting in the way.

In a further aspect, the present invention also relates to a method for craneless blade dismounting at wind turbines, wherein the method comprising the following steps:

A1) connecting a first wire between a hub of a wind turbine and a blade tip beam, A2) securing a blade tip beam with a first end to the blade by clamping, A3) controlling and regulating the tension of the first wire, so that it is able to carry the weight of the blade, when in vertical position, A4) removing blade bearing bolts, A5) lowering the blade and guiding the first end of the blade tip beam into a blade supporting structure, A6) the blade support structure supporting the blade tip beam with maximum 20% of the weight of the blade, while the rest of the weight of the blade is supported by the first wire, A7) moving the blade supporting structure away from the wind turbine while lowering the blade root end.

This makes it possible to conduct a method to craneless blade dismounting at wind turbines, where a blade tip beam is clamped at or around a blade, which is done by having a person climbing down the blade and fastening the blade tip beam to the blade via clamping. Alternatively is a remote control solution an option.

Further is it possible to control the movement of the blade by means of a first wire and the blade supporting structure.

In a further aspect, the present invention also relates to a method, wherein the method at least comprises the following further step at least after step A2):

B1) fastening the blade tip beam to the blade root end by a root wire.

This makes it possible due to the root wire to ensure that the blade tip beam and hence the clamps do not lose their grip and slip off the blade.

In a further aspect, the present invention also relates to a method, wherein the method at least comprises the following further steps before step A4):

C1) hoisting auxiliary equipment to a nacelle of a wind turbine and installing the equipment, C2) hoisting blade hoist equipment to the hub using at least an auxiliary winch, C3) assembling the blade hoist equipment as needed, C4) attaching the first wire to the blade hoist and attaching the first wire to the blade.

This makes it possible both to get all the equipment transported to the right place of usage and to get the equipment assembled and attached.

Whether the auxiliary equipment and the blade hoist equipment is hoisted to a nacelle or to a hub is not itself important and it is therefore—in this case—meant that it could be either, depending on the specific wind turbine construction.

In a further aspect, the present invention also relates to a method, wherein the method at least further comprises the following steps before step A5):

D1) attaching at least a tag wire to the blade for controlling the blade movement, D2) lowering the blade approximately 0.5 m by means of the blade hoist, D3) adding lifting slings and/or additional wires to the blade root end for further supporting options of the blade.

This makes it possible to lower the blade, after having attached the tag wire to the blade being able to control the sideways movement of the blade, as well as further enhancements are possible.

In a further aspect, the present invention also relates to a method, wherein the method at least comprises the following further step after step A6):

F1) securing the blade tip beam in the blade supporting structure.

This makes it possible to control the movement of the blade tip beam due to the blade supporting structure during dismounting of the blade from a vertical position in into a horizontal position and ensure that the blade remains in the position as desired and that the blade does not by accident e.g. hit the ground etc.

In a further aspect, the present invention also relates to a method, wherein the method at least is comprising the following further step at least after step A7):

E1) lowering the blade root end onto a root support.

This makes it possible to end up with a blade which is controlled and fixed to a blade supporting structure in one end and which is resting on a root support in the other end of the blade, when in horizontal position.

In a further aspect, the present invention also relates to a method, wherein the blade supporting structure being adapted to at least receive and support said first end of the blade tip beam with a variable angle of the blade tip beam during displacement of the blade supporting structure.

This makes it possible to control the movement of the blade tip beam due to the blade supporting structure and from a certain angle from horizontal to horizontal position and during dismounting and thereby ensure that the blade remains in the position as desired and that the blade does not by accident e.g. hit the ground etc.

In a further aspect, the present invention also relates to a method, wherein the blade tip beam further comprises at least a second clamping device placed substantially perpendicular to the longitudinal beam and substantially parallel with and in the same direction as the first clamping device, and in a further aspect, the present invention also relates to a method, wherein the distance between the first clamping device and the second clamping device of the blade tip beam is maximum 4 meter, such as in the range of 1-3 meter, e.g. in the range of 1.5-2.5 meter.

This makes it possible to further secure the grip at the blade, so that there are two clamping devices each clamping at a different place at the blade and hence ensuring that the blade tip beam are more stable fastened to the blade. This makes it further possible to position the blade tip beam at the blade, at the places where the blade is strongest, which may vary from blade to blade, dependent on the blade manufacturer.

In a further aspect, the present invention also relates to a method, wherein the length of the first end of the blade tip beam is at least 0.5 meter, such as in the range of 0.5-3 meter, e.g. in the range of 1-2 meter.

This makes it possible to get the end of the blade tip beam to fit into contact with the blade supporting structure without the blade tip end getting in the way.

DRAWING

The invention will be described in further detail below by means of non-limiting embodiments with reference to the drawing, where the drawing essentially is showing the preparation for and the blade removal/dismounting in which:

DETAILED DESCRIPTION

Figure 1:
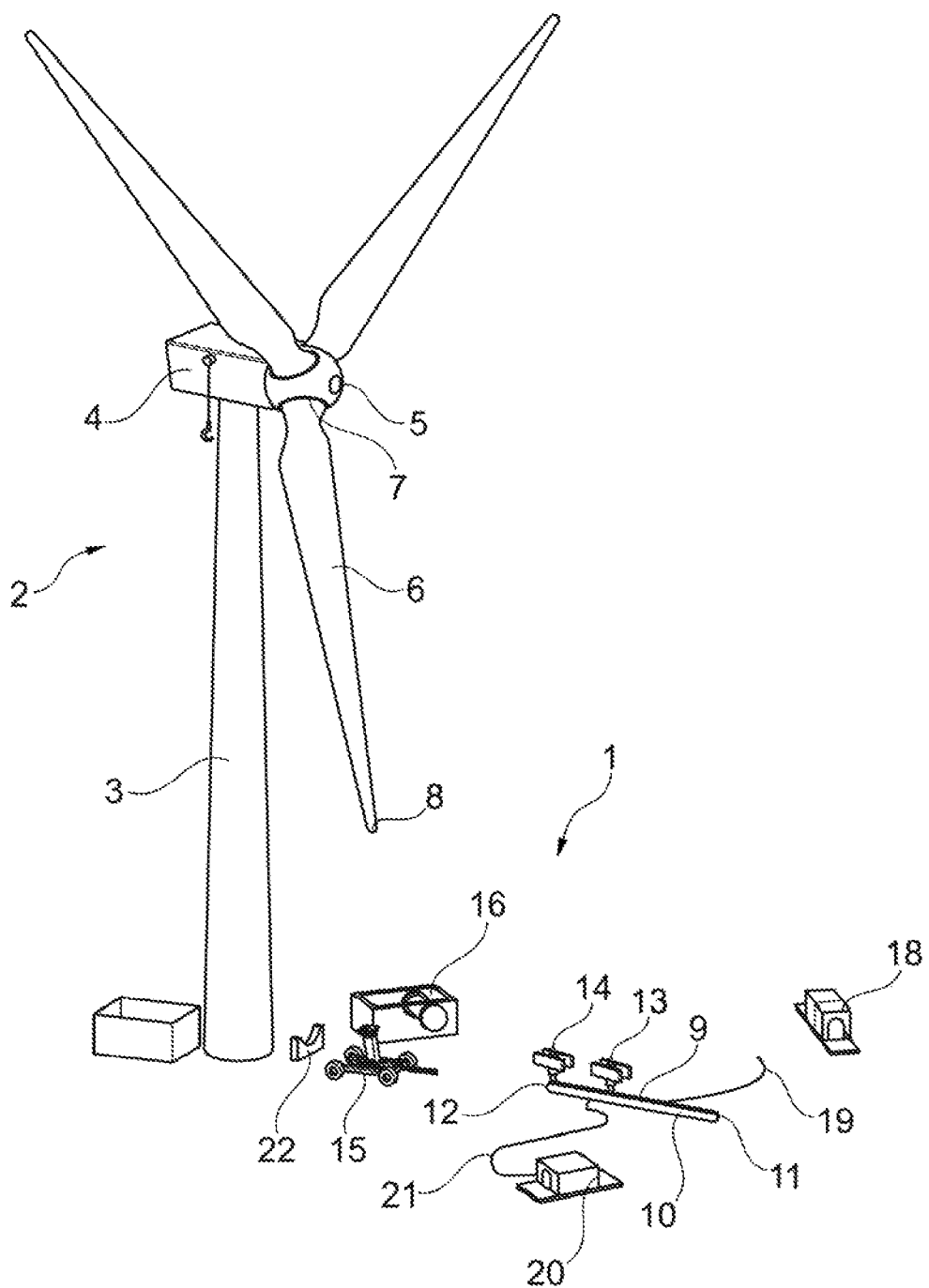
FIG. 1 shows the essential parts of the system.

In the drawing, the following reference numerals have been used for the designations used in the detailed part of the description:

1 System for craneless blade mounting and dismounting at wind turbines
2 Wind turbine
3 Wind turbine tower
4 Nacelle
5 Hub
6 Blade
7 Blade root end/root end of the blade
8 Blade tip end/tip end of the blade
9 Blade tip beam
10 Beam
11 First end/first end, beam
12 Second end, beam
13 First clamping device
14 Second clamping device
15 Blade supporting structure
16 First winch
17 First wire
18 First tag wire winch
19 First tag wire
20 Second tag wire winch
21 Second tag wire
22 Root support
23 Auxiliary equipment
24 Auxiliary winch
25 Main blade exchange equipment
26 Additional sling/wire
27 Vehicle
28 Tiltable hopper device
29 Wheel
30 Drawbar 31 Root wire
32 Self-hoisting crane
33 Stationary service crane
34 Centre of gravity

DETAILED DESCRIPTION OF THE INVENTION

FIG. 1 shows the essential parts of a system 1 for craneless blade mounting and dismounting at wind turbines 2. The system 1 in situ is shown on site, onshore, where a wind turbine 2 is seen with a wind turbine tower 3, a nacelle 4, a hub 5 and a blade 6 with a blade root end 7 and a blade tip end 8. The system 1 comprises the equipment which is placed on the ground and which is to be assembled or mounted.

The figure shows equipment, such as a blade tip beam 9 with a longitudinal beam 10 and with a first end 11 and a second end 12, and where the blade tip beam 9 further has a first clamping device 13 and a second clamping device 14, where the second clamping device 14 is placed substantially perpendicular to the longitudinal beam 10 and substantially parallel with and in the same direction as the first clamping device 13, which is placed substantially perpendicular to the longitudinal beam 10 too.

Figure 12:
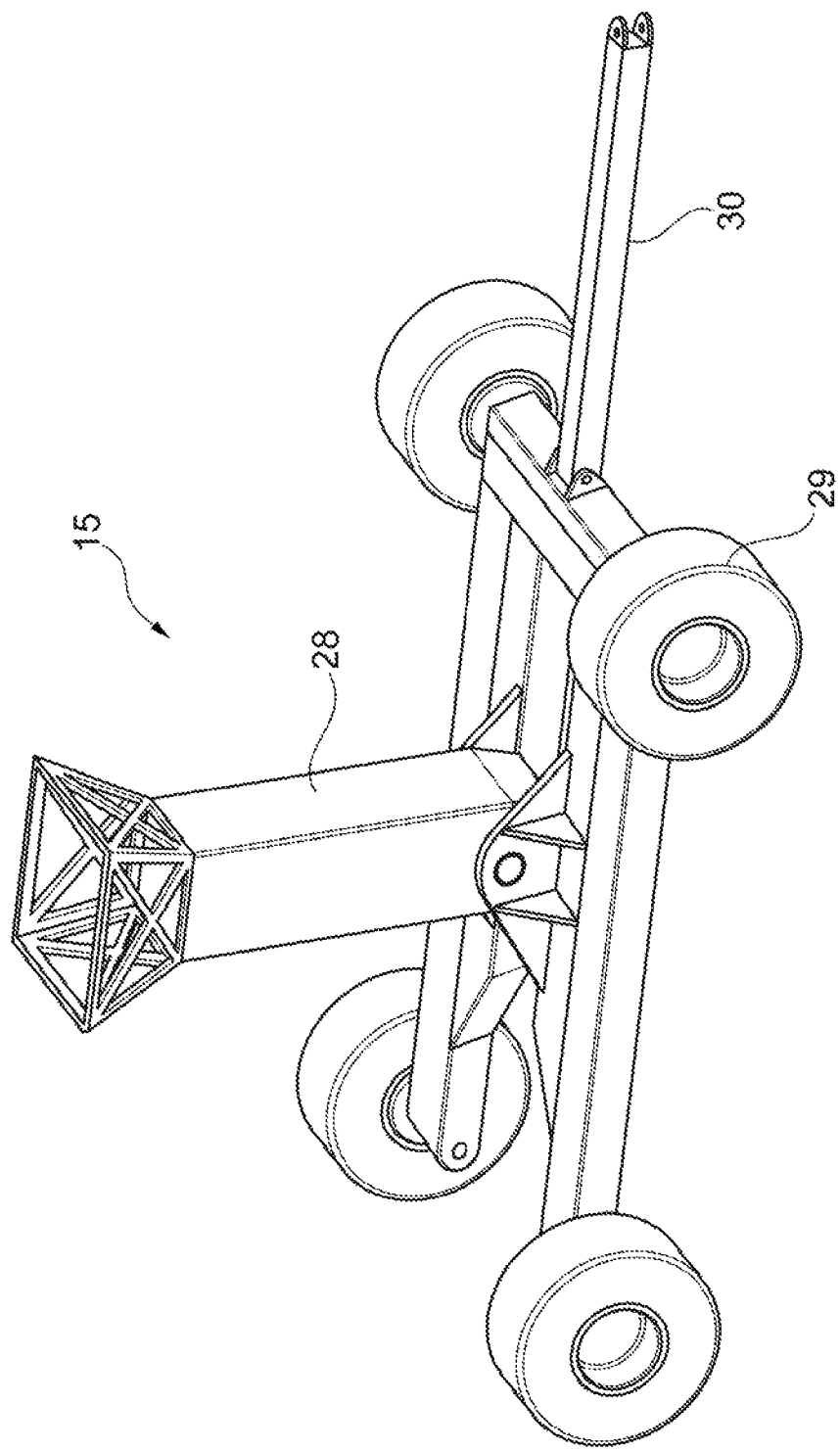
FIG. 12 shows the blade supporting structure alone.

The figure also shows a blade supporting structure 15, which is shown in larger detail and will be further described at FIG. 12.

The blade tip beam 9 and the blade supporting structure 15 is arranged to be fixed together by locking means, which are not shown in detail, but it is to be explicitly understood that the locking means are present.

The figure further shows a first winch 16 that is placed on the ground, ready via a first wire 17 (shown later) to be connected with the blade root end 7 via the hub 5. A first tag wire winch 18 via a first tag wire 19 as well as a second tag wire winch 20 via a second tag wire 21 are connected to the blade tip beam 9.

The figure finally shows a root support 22 for supporting the blade root end 7 where the root support 22 is shaped to and complementary with part of the cross sectional area of the blade 6. The root support 22 could further comprise wheels.

Figure 2:
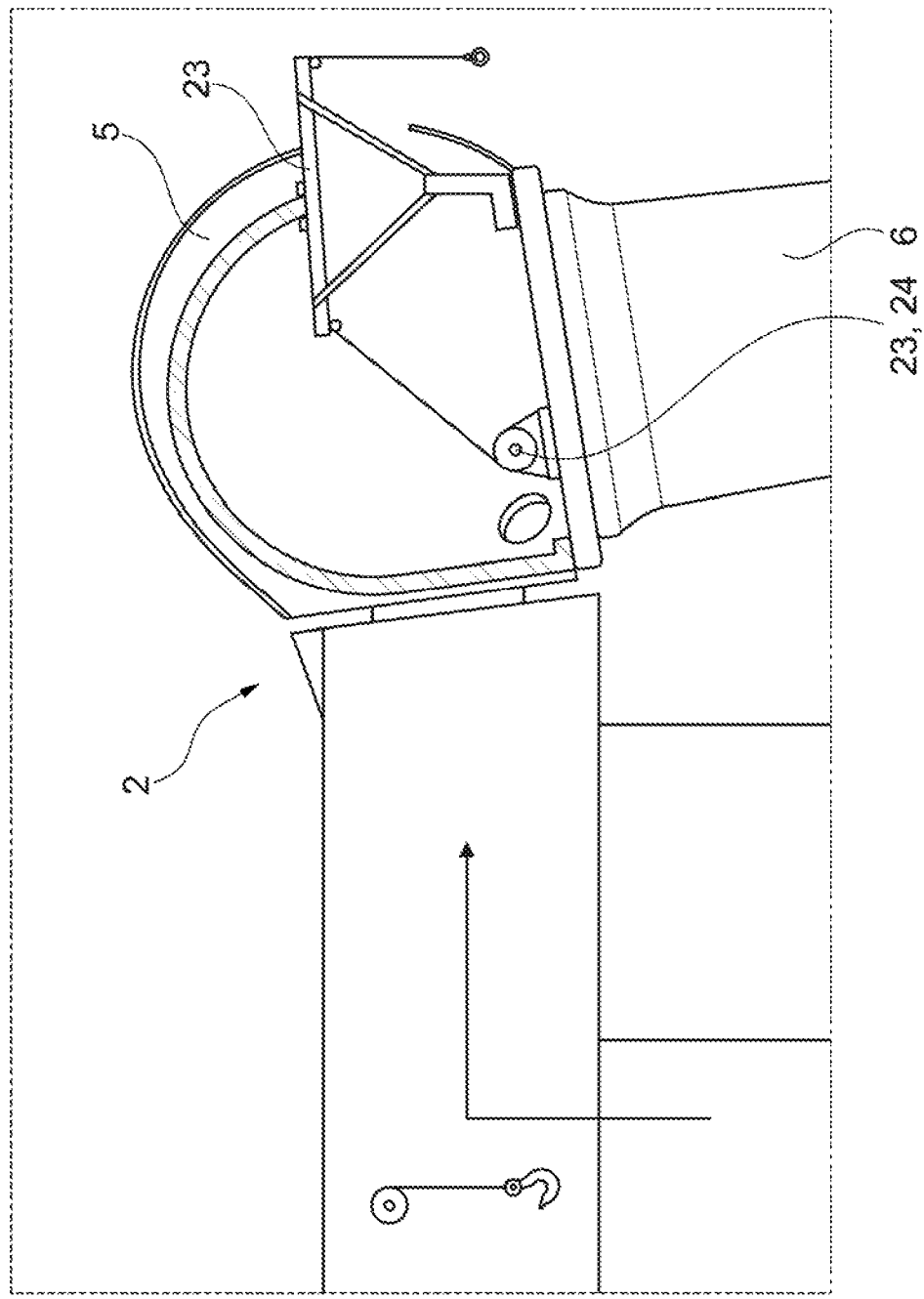
FIG. 2 shows a detail of a wind turbine with auxiliary equipment.

In FIG. 2 and other later figures is a part of the hub 5 removed to be able to see what is going on inside the hub 5 and thus for better understanding of the system 1.

FIG. 2 shows a detail of a wind turbine 2 with auxiliary equipment 23, where the auxiliary equipment 23 is hoisted to the nacelle 4, including an auxiliary winch 24 and where the auxiliary equipment 23 is assembled as needed.

Figure 3:
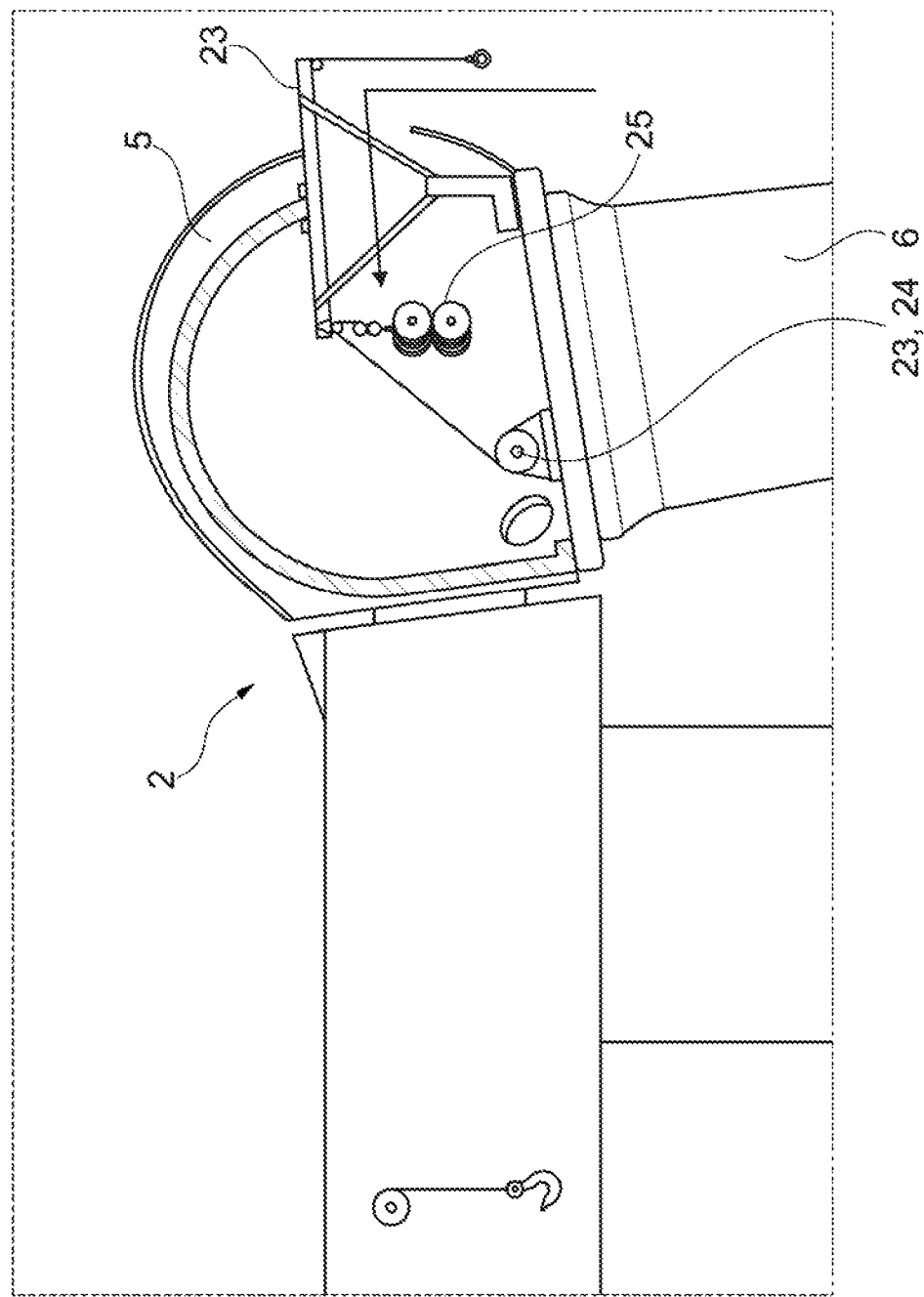
FIG. 3 shows a detail of a wind turbine with blade hoist equipment.

FIG. 3 shows a detail of a wind turbine 2 with blade hoist equipment 25, where the auxiliary equipment 23, including the auxiliary winch 24 is used to hoist the main blade exchange equipment 25 to the hub 5, where the main blade exchange equipment 25 also is assembled as needed.

Figure 4:
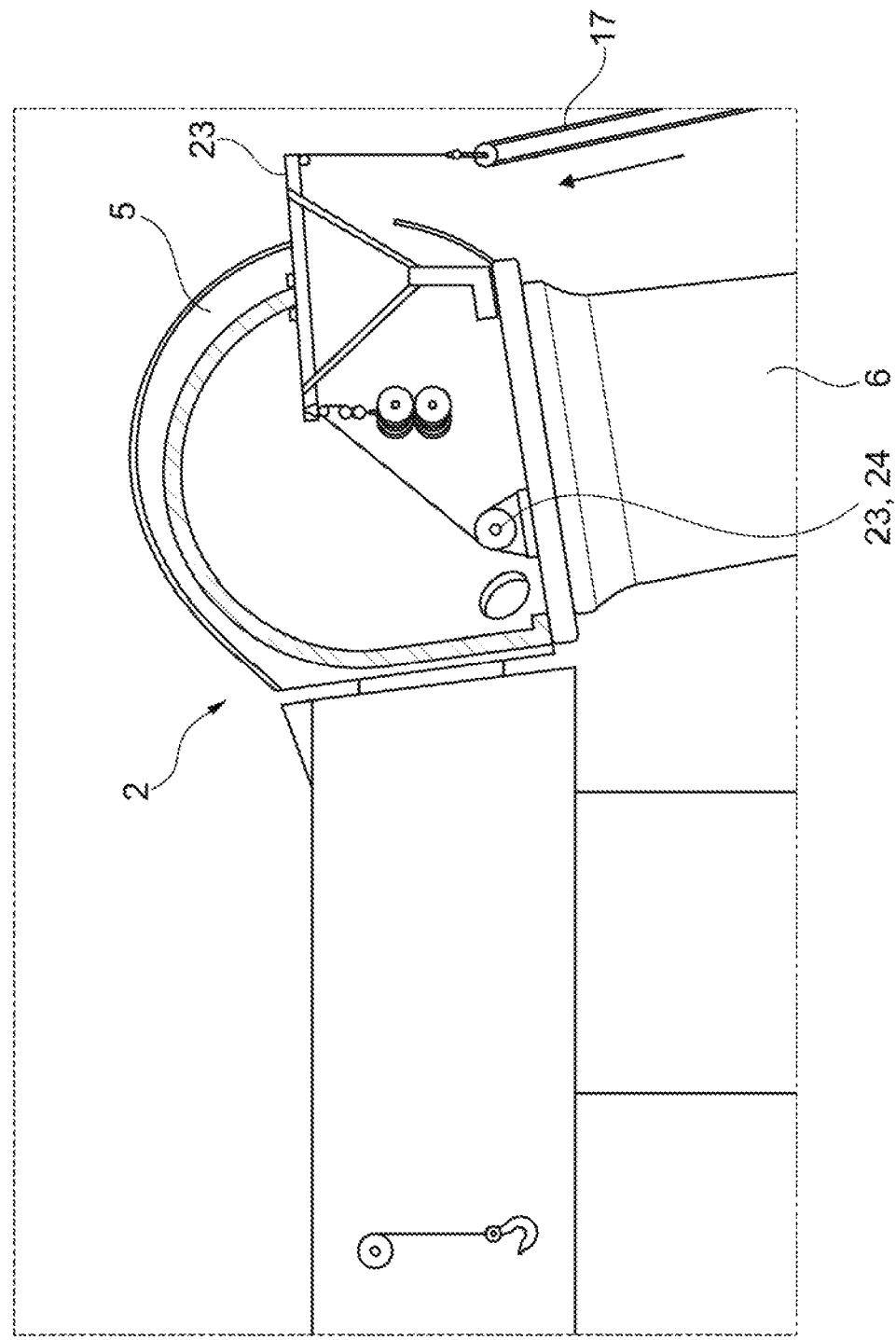
FIG. 4 shows a detail of a wind turbine with the main rope.

FIG. 4 shows a detail of a wind turbine 2 with the first wire 17, where the first wire 17 is lifted to the hub 5 and connected to the blade tip beam 9 on the ground.

Figure 5:
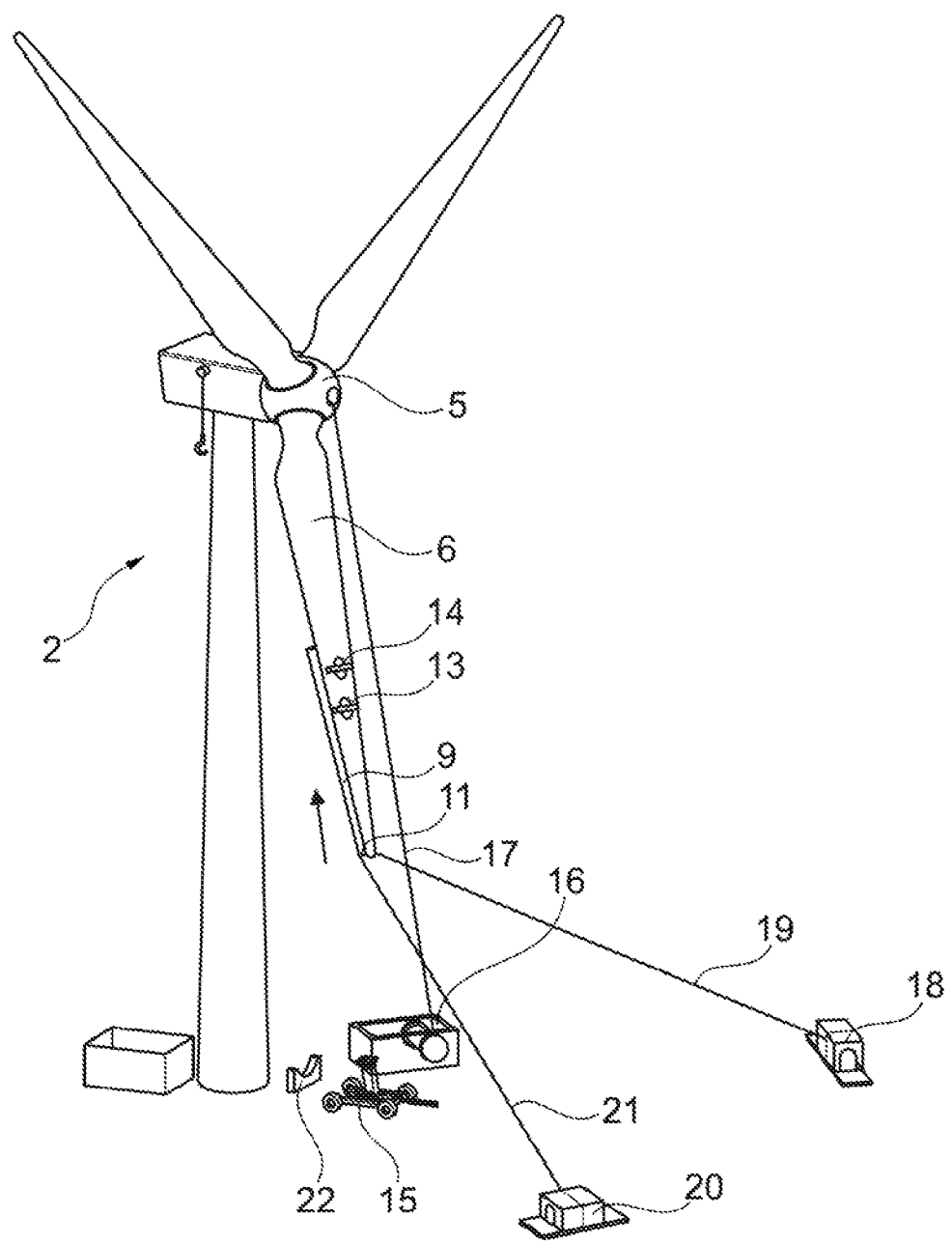
FIG. 5 shows the blade tip beam and tag wires.

FIG. 5 shows the blade tip beam 9 and tag wires 19 and 21, where the blade tip beam 9 is hoisted to the blade 6 by the first wire winch 16 and the first wire 17. The blade tip beam 9 is then secured to the blade 6 by the first clamping device 13 and a second clamping device 14 and also with a root wire 26 (not shown), so that the blade tip beam 9 cannot fall off the blade 6. The first tag wire 19 as well as the second tag wire 21 are connected to the blade tip beam 9 (shown at FIG. 1), where the tag wires 19, 21 are used in a V-formation to control the movement of the blade tip beam 9.

Figure 6:
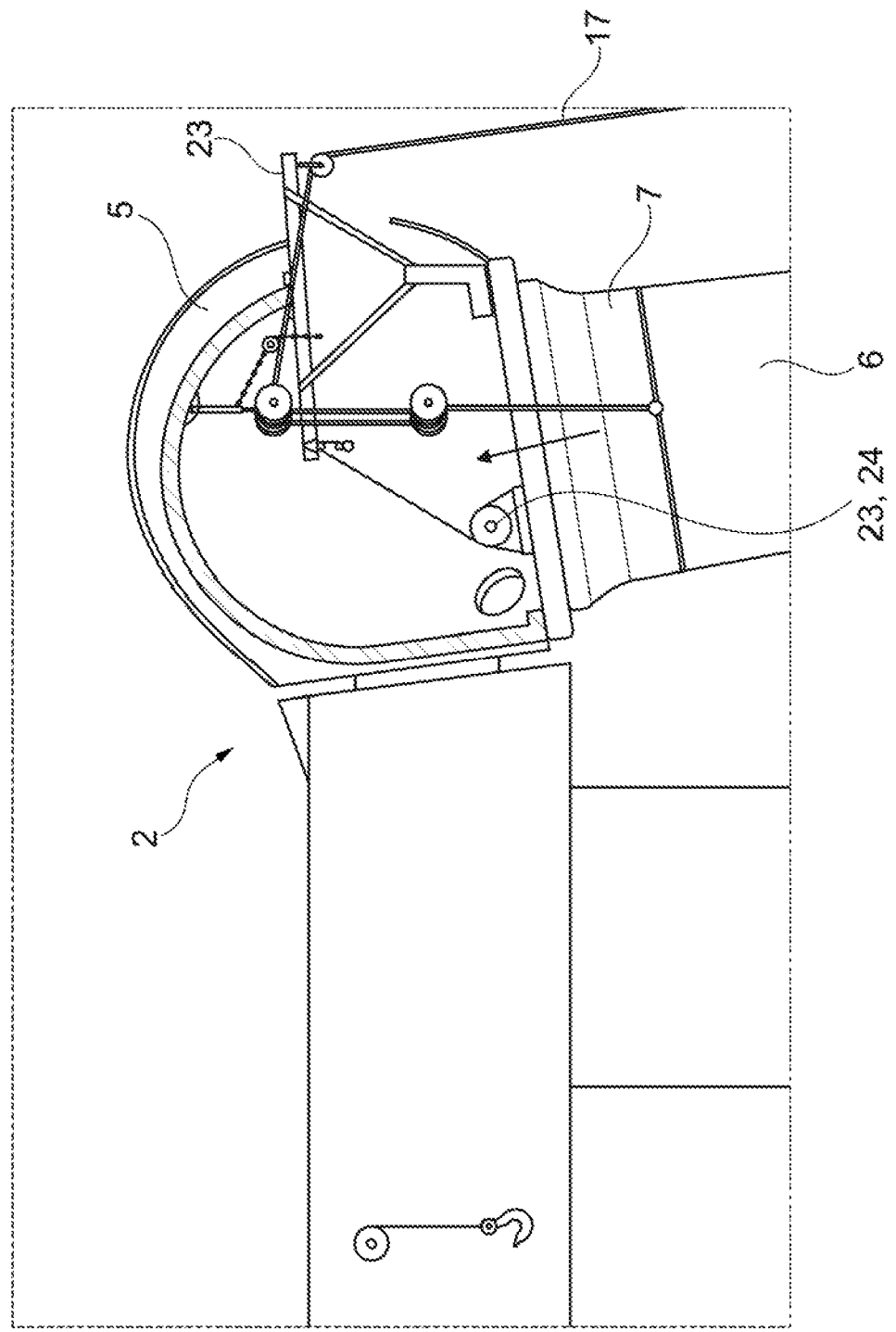
FIG. 6 shows a detail of a wind turbine with the main rope attached to the blade root.

FIG. 6 shows a detail of a wind turbine 2 with the first wire 17 attached to the blade root end 7, where the first wire 17 is tightened to carry the weight of the blade 6, adapter and bearing.

Figure 7:
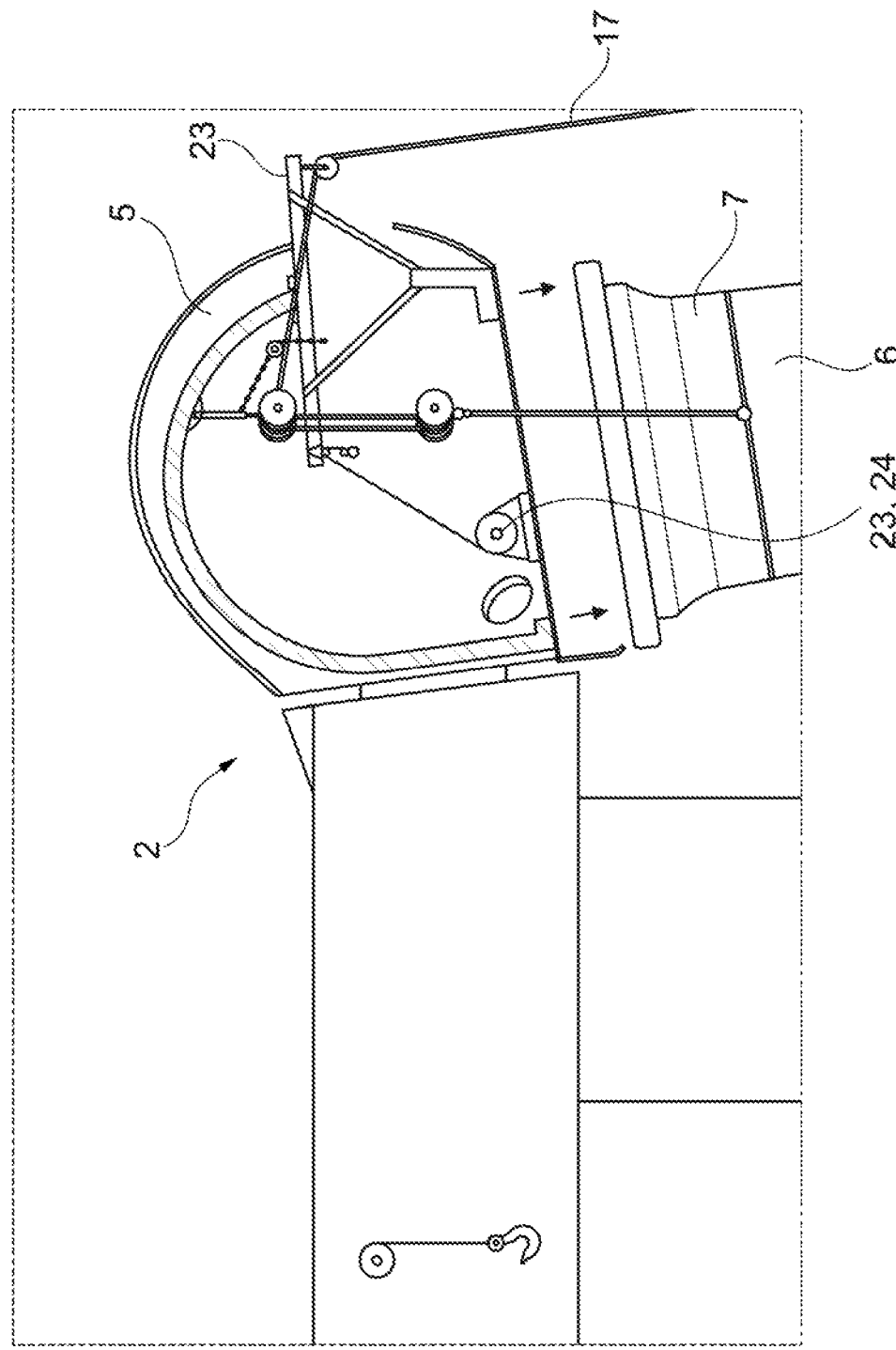
FIG. 7 shows a detail of a wind turbine where blade bearing bolts are removed.

FIG. 7 shows a detail of a wind turbine 2 where blade bearing bolts (not shown) are removed and the hub 5 and the blade 6 are no longer connected.

Figure 8:
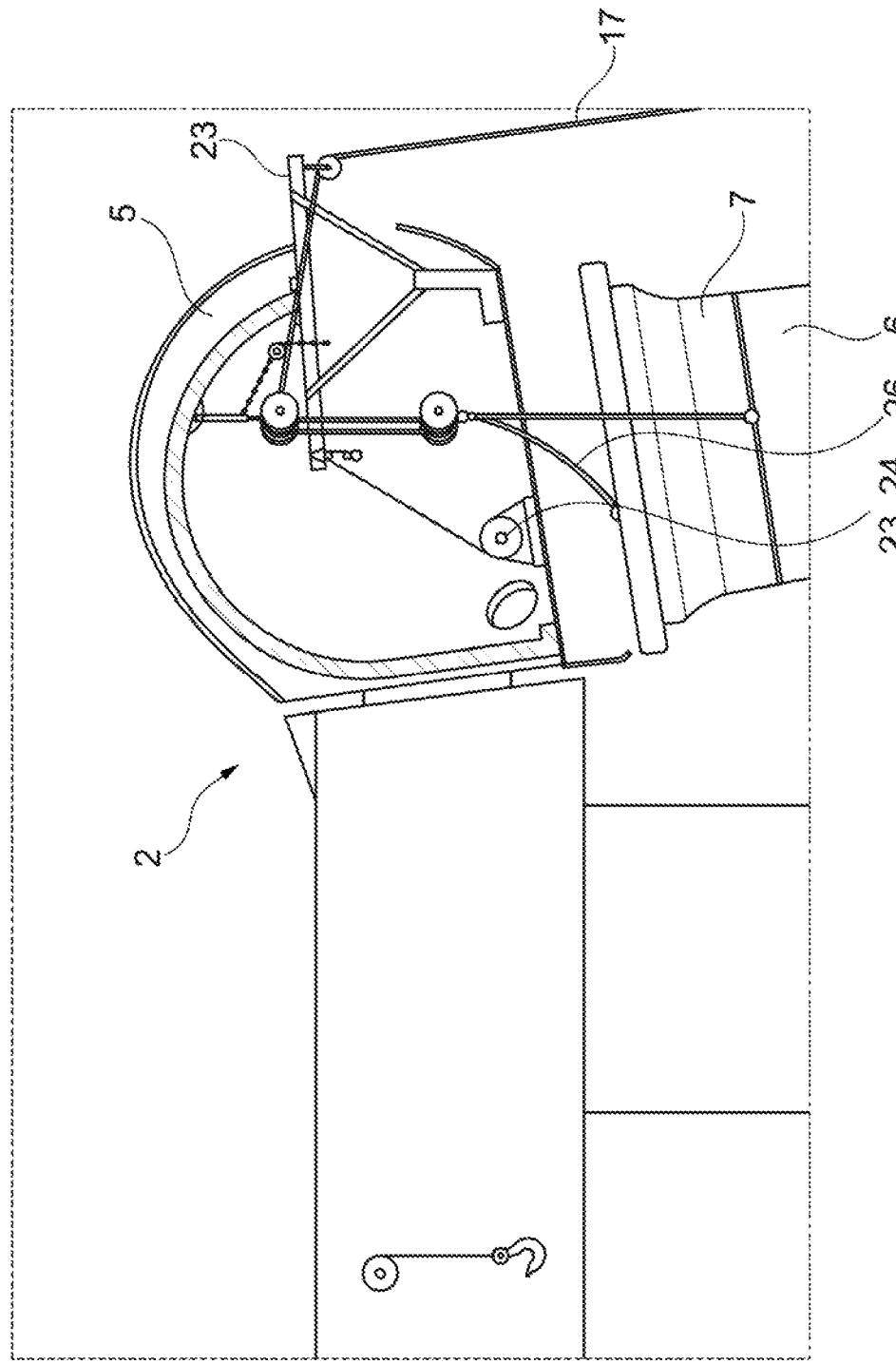
FIG. 8 shows a detail of a wind turbine where additional wires are added to the blade.

FIG. 8 shows a detail of a wind turbine 2 where additional slings/wires 26 are added to the blade 6 at the blade root end 7 for later support during the blade movement into horizontal position, and the blade 6 is lowered approx. 500 mm.

Figure 9:
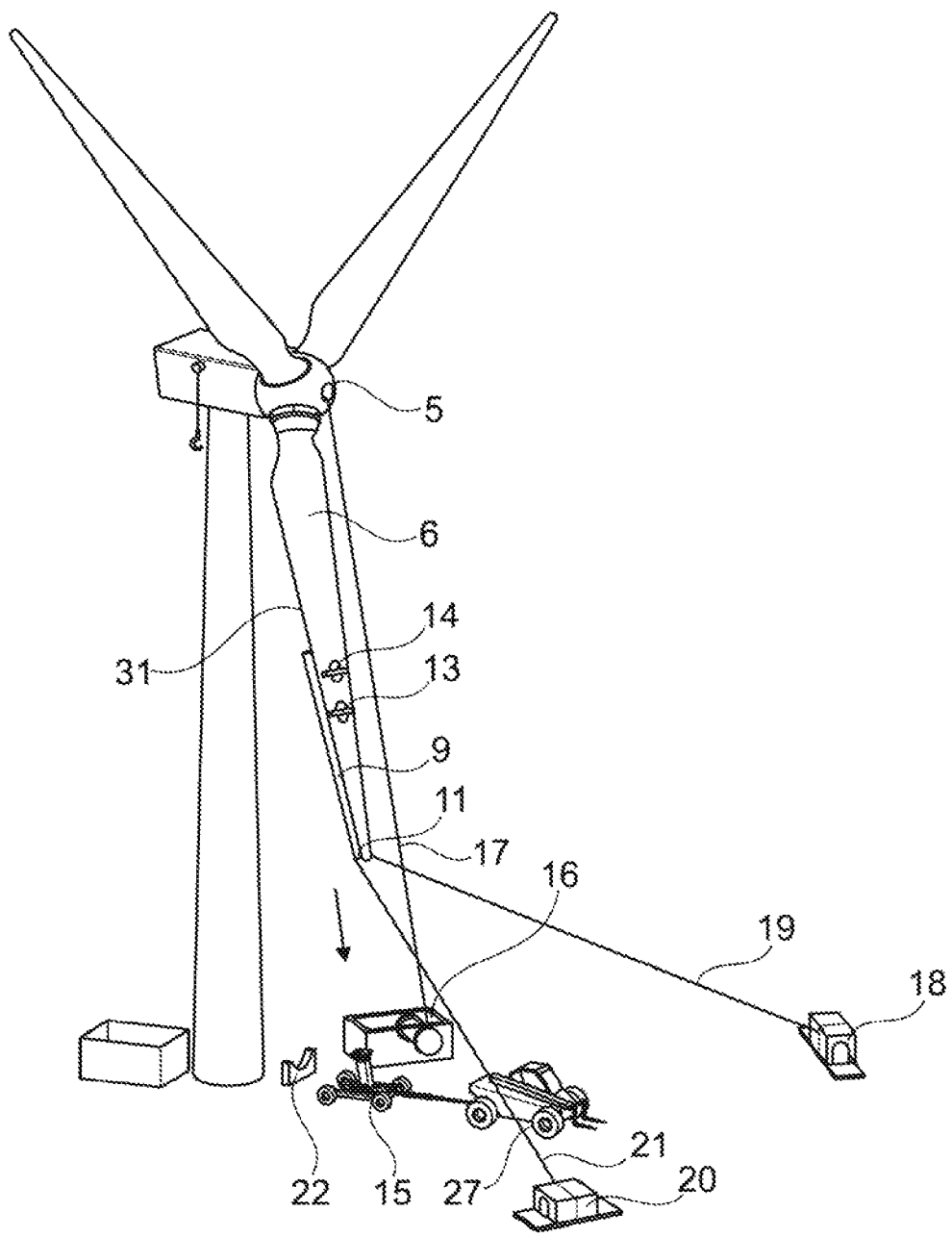
FIG. 9 shows lowering the blade and the blade tip beam being guided into the blade supporting structure.

FIG. 9 shows lowering the blade 6 and the blade tip beam 9 being guided into the blade supporting structure 15 where the blade tip beam 9 is secured. The blade tip beam 9 is also fastened to the blade root end 7 by means of a root wire 31.

The figure also shows that the blade supporting structure 15 is towed by a vehicle 27.

Figure 10:
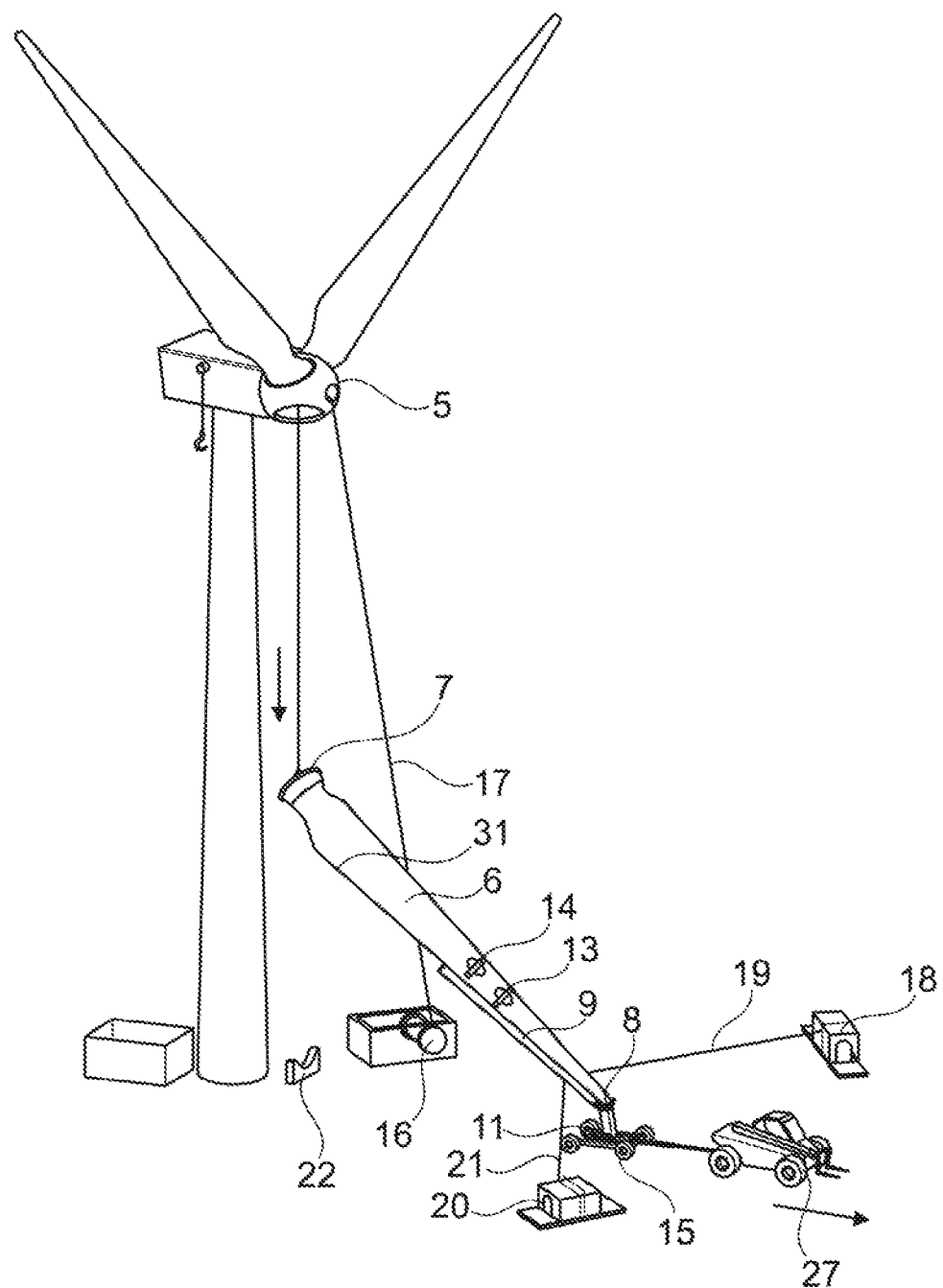
FIG. 10 shows the blade supporting structure being towed away.

FIG. 10 shows the blade supporting structure 15 being moved and towed away by the vehicle 27, as the blade 6 is lowered from the hub 5. While the blade 6 is lowered the first end 11 of the blade tip beam 9 is guided into the blade supporting structure 15, where the blade supporting structure 15 is receiving, supporting and securing said first end 11 of the blade tip beam 9.

Figure 11:
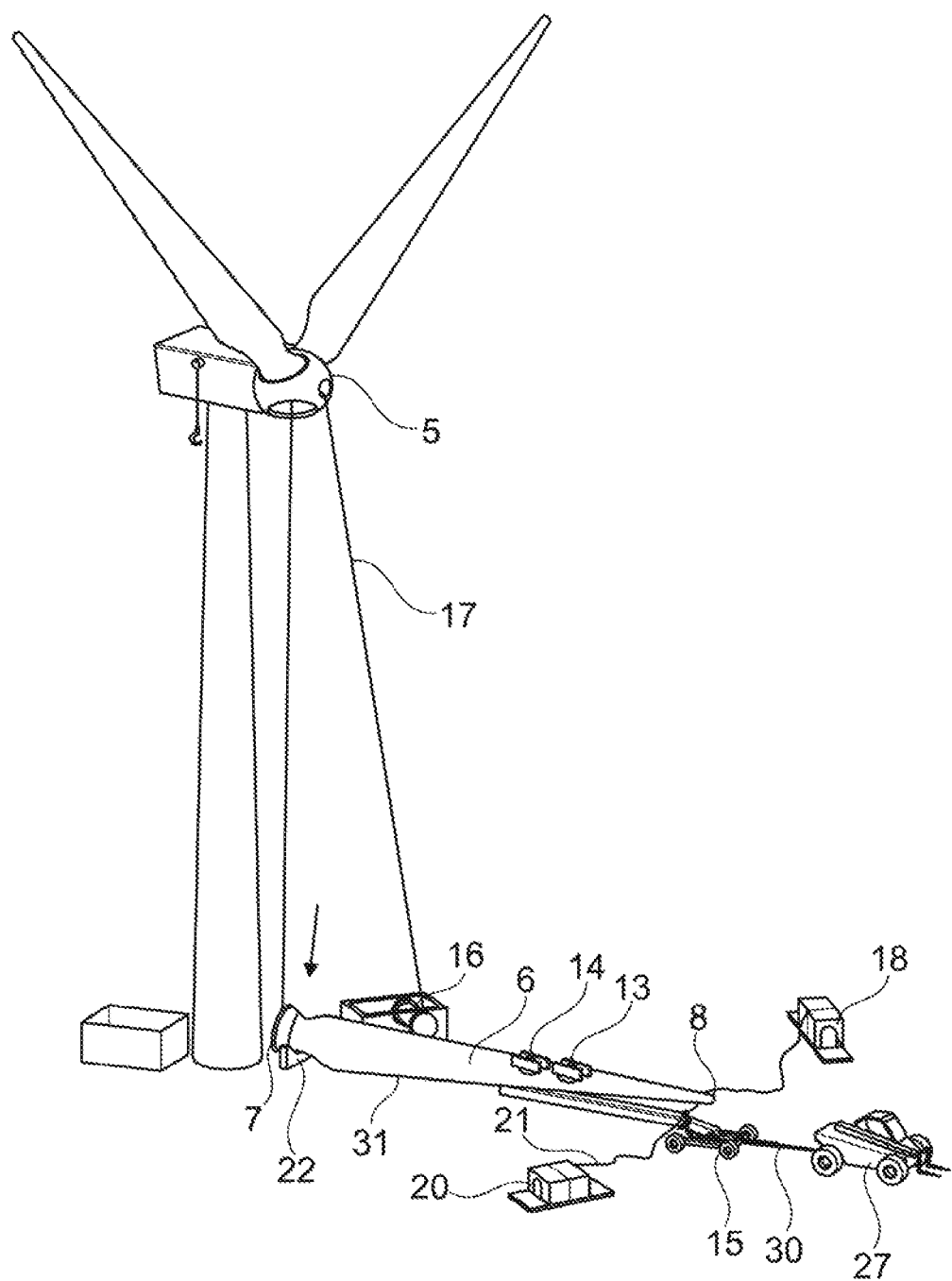
FIG. 11 shows the blade being lowered onto a root support.

FIG. 11 shows the blade 6 being lowered into horizontal position with the blade root end 7 placed on the root support 22.

FIG. 12 shows the blade supporting structure 15 alone, wherein the blade supporting structure 15 has a tiltable hopper device 28 to receive and support the first end 11 of the blade tip beam 9, where the tiltable hopper device 28 is adjustable in angle—from substantially horizontal position to substantially vertical position—in order to receive the blade tip beam 9 which angle to horizontal vary during mounting or dismounting the blade 6. The blade supporting structure 15 further comprises wheels 29 and a drawbar 30.

Figure 13:
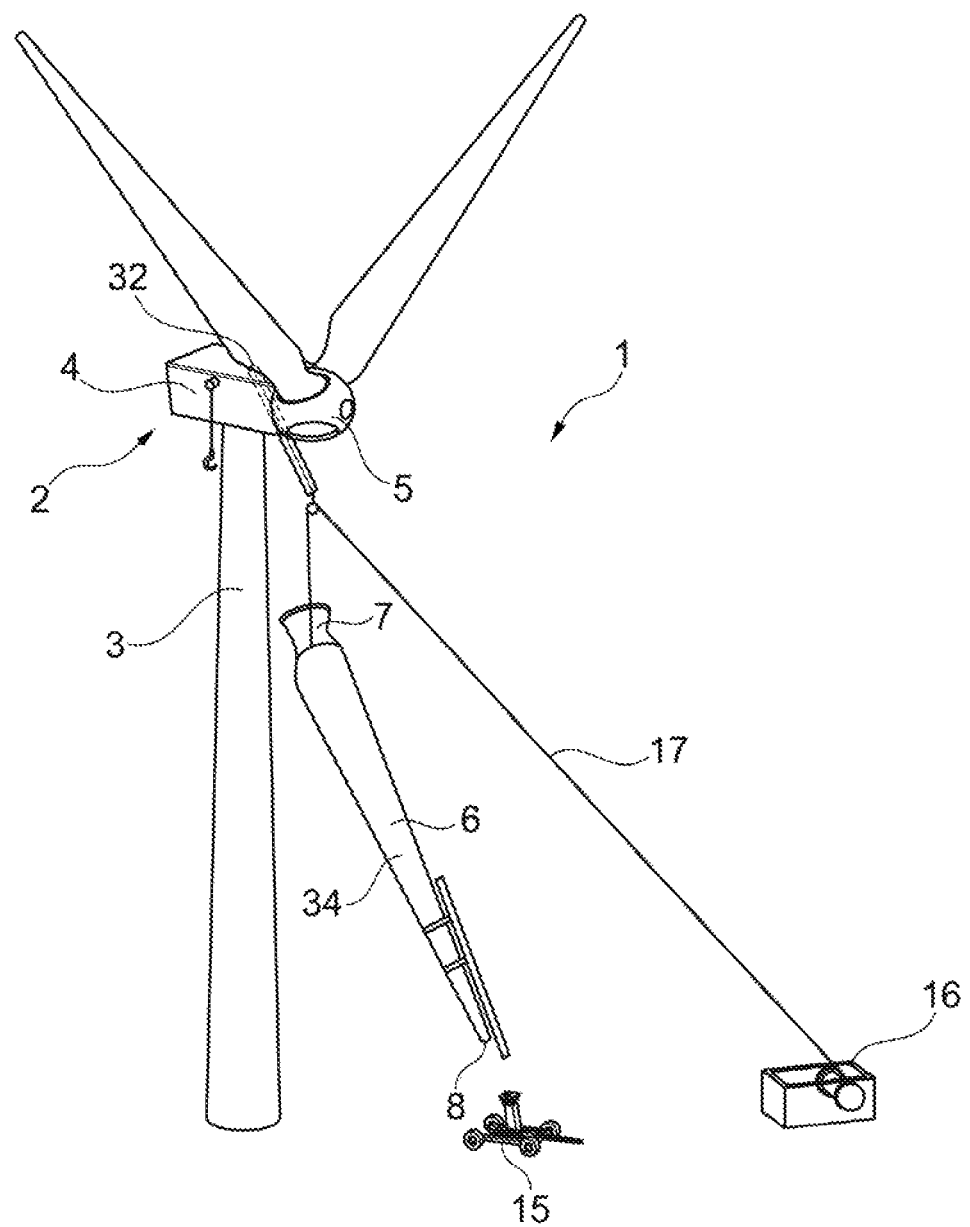
FIG. 13 shows a sketch of a system according to the invention utilising a self-hoisting crane.

FIG. 13 shows a sketch of a system according to the invention utilising a self-hoisting crane 32. The self-hoisting crane 32 is arranged on the outside of nacelle 4. The crane will be supported on the base structure (not illustrated) of the nacelle. The first wire 17 is connected to the blade tip beam 9 or directly to the blade 6 in a position which is not directly at the blade root end 7, but at a position between the blade root end and the centre of gravity 34 of the blade 6. Hereby the blade 6 will hang substantially vertical. Taglines may be used, but can also be omitted.

The first wire 17 establishes a connection between the first winch 16 and the blade root end 7 via the self-hoisting crane 32.

Figure 14:
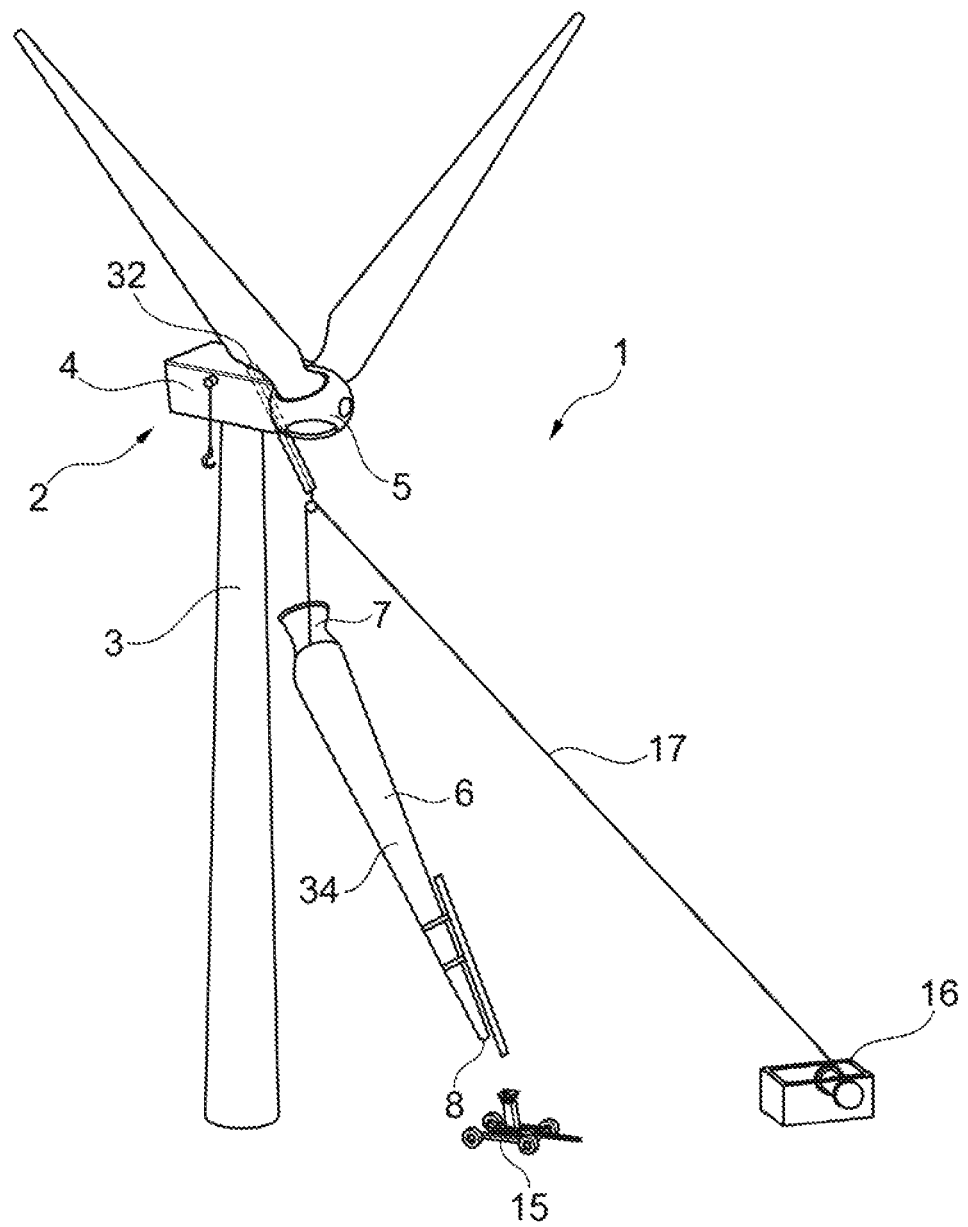
FIG. 14 shows a sketch of a system according to the invention utilising a stationary service crane.

FIG. 14 shows a sketch of a system according to the invention utilising a stationary service crane 33. The stationary service crane 33 is arranged on the outside of nacelle 4. The crane will be supported on the base structure (not illustrated) of the nacelle. The first wire 17 is connected to the blade tip beam 9 or directly to the blade 6 in a position which is not directly at the blade root end 7, but at a position between the blade root end and the centre of gravity 34 of the blade 6. Hereby the blade 6 will hang substantially vertical. Taglines may be used, but can also be omitted.

The first wire 17 establishes a connection between the first winch 16 and the blade root end 7 via the stationary crane 33.

The embodiments illustrated in FIGS. 13 and 14 involves that while the blade 6 is lowered, the first end 11 of the blade tip beam 9 is guided into the blade supporting structure 15, where the blade supporting structure 15 is receiving, supporting and securing said first end 11 of the blade tip beam 9.

The shown variants are not limiting to the scope of the invention but are only examples of how the invention can be practised, as a skilled person in the art will be able to apply the invention in many other ways and in several other variants after reading the present description.

The invention claimed is:

1. System (1) for craneless blade (6) mounting and dismounting at wind turbines (2), wherein the system (1) at least comprises a blade tip beam (9) to be fixed at the blade (6) and a displaceable arranged blade supporting structure (15) to be connected with and to guide and secure the blade tip beam (9) while the supporting structure (15) is displaced in a substantially horizontal direction;
   where the blade tip beam (9) at least comprises a longitudinal beam (10) with a first end (11) and a second end (12) and where the blade tip beam (9) further at least comprises a first clamping device (13), where the beam (10) is adapted to be arranged substantially parallel to the lengthwise direction of a blade (6) with the first end (11) of the blade tip beam (9) extending in the same direction as the tip end of the blade (8), where the blade tip beam (9) further comprises a second clamping device (14) placed substantially perpendicular to the longitudinal beam and substantially parallel with and in the same direction as the first clamping device (13), and where each of the clamping devices (13, 14) is adapted to be clamped at least partially around the blade (6) in the crosswise direction of the blade (6);
   wherein the blade supporting structure (15) comprises a tiltable hopper device (28) adapted to receive and support said first end (11) of the blade tip beam (9) with a variable angle of the blade tip beam (9) during displacement of the blade supporting structure (15);
   wherein the blade tip beam (9) further comprises locking means capable of securing the blade tip beam (9) to the tiltable hopper device (28) of the blade supporting structure to the blade tip beam;
   wherein the system (1) further comprises equipment for hoisting and/or lowering the blade (6) by means of at least a first winch (16) placed on the ground and at least a first wire (17) for connection between the first winch (16) and the blade (6);
   wherein the first wire (17) is connected with the blade (6) at a root end (7) of the blade (6) or in a position between the root end (7) and the centre of gravity of the blade, for the blade (6) to hang substantially vertical; and
   wherein the connection between the first winch (16) and the blade (6) is effected via a hub (5) of the wind turbine (2) arranged at a nacelle (4) of the wind turbine (2).

2. System (1) according to claim 1, wherein the system (1) further comprises at least a first tag wire (19) connected to the blade or the blade tip beam.

3. System (1) according to claim 1, wherein the system (1) further comprises at least a first tag wire winch (18) and a first tag wire (19) for connection between the blade (6) and the first tag wire winch (18).

4. System (1) according to claim 2, wherein the system (1) further comprises at least a second tag wire winch (20) and a second tag wire (21) for connection between the blade (6) and the second tag wire winch (20), wherein a V-formation of the tag wires (19,21) being achievable.

5. System (1) according to claim 1, wherein the system (1) further comprises a root wire (31) for connection between the blade tip beam (9) and the root end of the blade (7).

6. System (1) according to claim 2, wherein the system (1) further comprises a system capable of automatically control and regulation of the first winch (16), so that the system for automatically control and regulation of the first winch (16) is adapted to ensure that at least 60%, such as in the range of 60-90% of the weight of the blade (6), is placed on the first winch (16), when the blade (6) is supported by the blade supporting structure (15) during lowering and/or hoisting the blade (6).

7. System (1) according to claim 1, wherein the blade tip beam (9) further comprises a second clamping device (14) placed substantially perpendicular to the longitudinal beam (10) and substantially parallel with and in the same direction as the first clamping device (13).

8. System (1) according to claim 1,
   wherein the system (1) further comprises at least a root support (22) for supporting the root end of the blade (7).

9. System (1) according to claim 8, wherein the root support (22) further comprises wheels.

10. Combination comprising a blade tip beam (9) and a displaceable arranged blade supporting structure (15), which combination is for a system (1) for craneless blade (6) mounting and dismounting at wind turbines (2), wherein the blade supporting structure (15) is arranged to be connected with and to guide and secure the blade tip beam (9) while the supporting structure (15) is displaced in a substantially horizontal direction, wherein the blade tip beam (9) comprises a longitudinal beam (10) with a first end (11) and a second end (12) where the blade tip beam (9) further comprises a first clamping device (13) placed substantially perpendicular to the longitudinal beam (10) and closer to the second end (12) than to the first end (11), wherein the blade tip beam (9) further comprises a second clamping device (14) placed substantially perpendicular to the longitudinal beam and substantially parallel with and in the same direction as the first clamping device (13), where the beam (10) is adapted to be arranged substantially parallel to the lengthwise direction of a blade (6) and where each of the clamping devices (13,14) is adapted to be clamped at least partially around the blade (6) in the crosswise direction of the blade (6), wherein the blade supporting structure (15) comprises a tiltable hopper device (28) adapted to receive and support said first end (11) of the blade tip beam (9) with a variable angle of the blade tip beam (9) during displacement of the blade supporting structure (15), wherein the blade tip beam (9) further comprises locking means capable of securing the blade tip beam (9) to the tiltable hopper device (28) of the blade supporting structure to the blade tip beam.

* * * * *